March 29, 1955     J. E. SHAFER     2,705,161
BEARING SEAL
Filed March 29, 1950     2 Sheets-Sheet 1
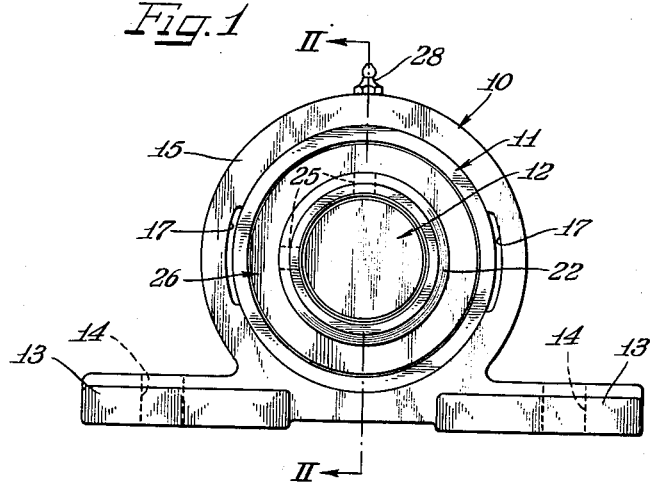
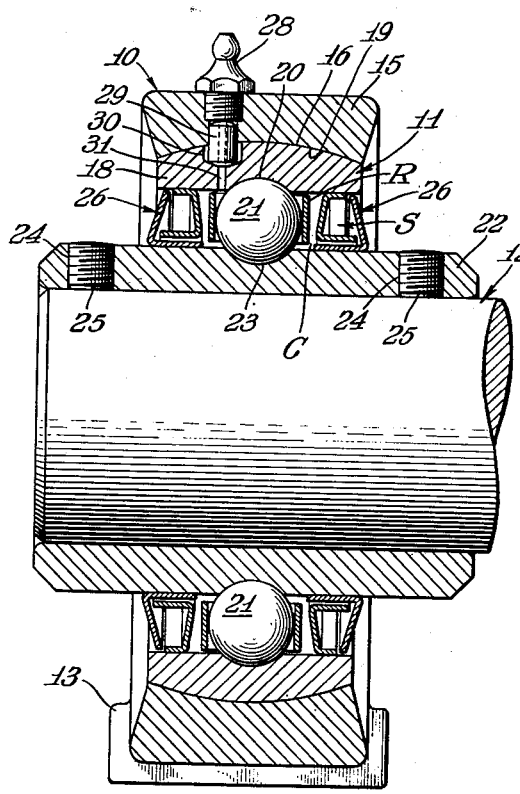
Inventor
Julius E. Shafer
by The firm of Charles A. Hill
Attys March 29, 1955  J. E. SHAFER  2,705,161
BEARING SEAL
Filed March 29, 1950 2 Sheets-Sheet 2
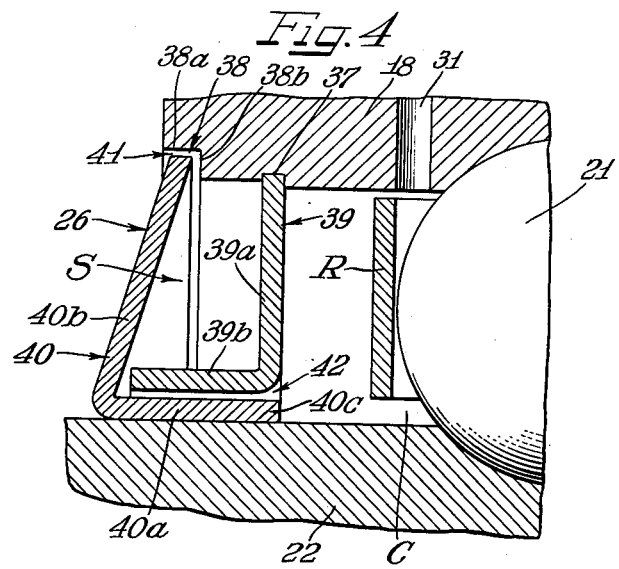
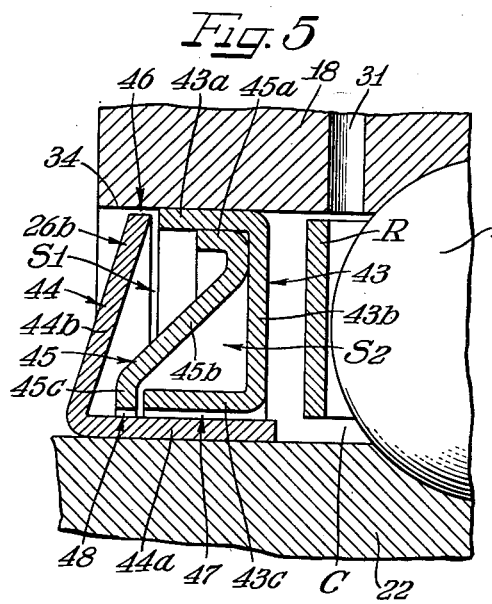
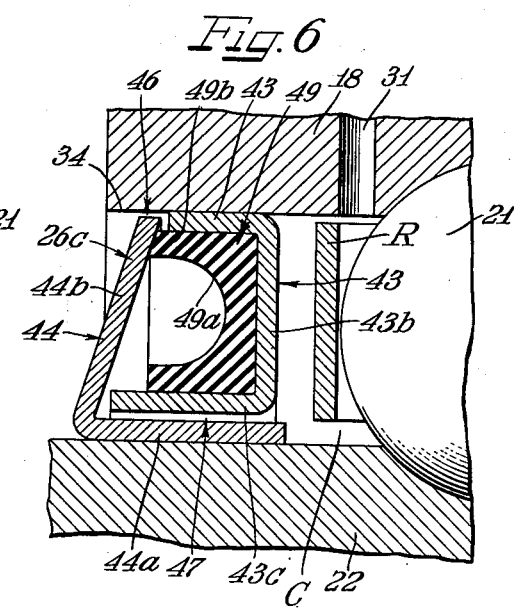
Inventor
Julius E. Shafer
by The Firm of Charles H. Lill
Attys

United States Patent Office 2,705,161
Patented Mar. 29, 1955

2,705,161

BEARING SEAL

Julius E. Shafer, Chicago, Ill.; The Northern Trust Company, executor of said Shafer, deceased Application March 29, 1950, Serial No. 152,693

9 Claims. (Cl. 286—5)

This invention relates to sealed bearing units wherein relatively rotating seal members define therebetween a chamber of substantial size which communicates at its outer end with the atmosphere and at its inner end with the bearing chamber through narrow gaps effective to minimize passage of foreign material from the outside into the chamber and passage of grease from the bearing space into the chamber while at the same time accommodating pressure flow of grease from the bearing space to create a grease seal in the chamber.

Specifically, the invention deals with a bearing seal composed of a stationary retainer ring and a rotating flinger ring coacting to define a chamber therebetween with an L-shaped close running clearance gap communicating with the outside atmosphere and an elongated close running clearance gap communicating with the bearing space.

This application is a continuation in part of my co-pending application entitled "Bearing Seal," Serial No. 135,051, filed December 27, 1949.

While the invention will be hereinafter specifically described as embodied in an industrial ball bearing unit of the pillow block type, it should be understood that the seals of this invention are not limited to such preferred usage, but are generally useful in sealing the anti-friction element chamber of any type of anti-friction bearing.

According to this invention, a metal retainer ring is secured in the outer race ring of a bearing unit and extends inwardly toward the inner race ring of the unit and thence axially outward to overlie the inner race ring in spaced parallel relation. A flinger is secured on the inner race ring of the unit and has a base underlying the axially extending portion of the retainer to coact therewith in defining an axially extending narrow gap. The inner end of this base terminates in an upstanding shoulder inwardly of the retainer. The flinger has a flange overlying the retainer which extends radially outward and axially inward to coact with the retainer for defining a chamber of appreciable size. The radial outer end of the flinger flange has close running clearance relationship on two sides with the outer race ring or structure carried by the outer race ring. The chamber between the sealing rings thereby communicates with the outside atmosphere through an L-shaped narrow gap and with the bearing space through an axially elongated narrow gap. The retainer is either press fitted into the outer race ring or snapped into a groove in the outer race ring. The flinger is preferably press fitted onto the inner race ring. In one embodiment, the retainer may carry a third ring which divides the chamber between the retainer and flinger into two compartments and which has close running clearance relationship with the base of the flinger. In another embodiment, the retainer may carry a deformable ring such as a ring of oil-resistant rubber-like material and this ring may have a portion thereof riding on the flinger flange.

It is, then, an object of this invention to provide a bearing seal composed of relatively rotating metal rings which cooperate to define a chamber therebetween with an L-shaped entrance gap at one end and an axially elongated entrance gap at the other end.

A still further object of the invention is to provide a bearing seal wherein relatively rotating retainer and flinger rings define a grease chamber therebetween adapted to be pressure loaded with grease from the bearing space without, however, throwing grease from the bearing or permitting entrance of outside entraneous matter into the bearing.

A still further object of this invention is to provide a metal bearing seal wherein a retainer member and a rotating flinger member define therebetween a relatively enlarged seal chamber adapted to receive grease that is pressured into the bearing space of the bearing sealed thereby to form a grease seal with the retainer while preventing ingress of extraneous matter into the chamber by means of an L-shaped gap defined between the flinger and adjacent structure.

A specific object of the invention is to provide a bearing seal composed of a retainer ring having an outer rim adapted to be pressed into the outer race ring of a bearing, an inwardly extending wall adapted to bridge the space between the inner and outer race rings of a bearing, and an inner rim adapted to overlie the inner race ring of the bearing in spaced parallel relation therewith together with a flinger having a base adapted to be pressed onto the inner race of the bearing and have close running clearance relationship with the inner rim of the retainer together with a sloping flange adapted to span the space between the rims of the retainer and have close running clearance relationship with the outer rim of the retainer and with the inner surface of the outer race ring.

A still further object of the invention is to provide a bearing seal composed of a flinger ring having an L-shaped cross section and a retainer ring having a generally U-shaped cross section wherein one leg of the retainer has close running clearance relation along its length with one leg of the flinger while the other leg of the retainer has close running clearance relationship with the second leg of the flinger.

Other and further objects of the invention will be apparent to those skilled in the art from the annexed sheets of drawings which, by way of preferred embodiments only, illustrate several modifications of the invention.

On the drawings:

Figure 1 is a side elevational view of a sealed bearing unit equipped with seals according to this invention and mounted in a one-piece pillow block.

Figure 2 is a vertical cross-sectional view, with parts in elevation, taken substantially along the line II—II of Figure 1.

Figure 3 is a greatly enlarged fragmentary vertical cross-sectional view showing details of one of the seals of the bearing of Figures 1 and 2.

Figure 4 is a view similar to Figure 3 but illustrating a first modified form of bearing seal.

Figure 5 is a view similar to Figure 3 but illustrating a second modified form of bearing seal.

Figure 6 is a view similar to Figure 3 but illustrating a third modified form of bearing seal.

As shown on the drawings:

The pillow block unit 10 of Figures 1 and 2 mounts the bearing unit 11 sealed with a pair of seals of this invention. This bearing unit 11 rotatably carries a shaft 12 locked in the inner race ring of the bearing. The pillow block 10 has mounting feet 13, 13, with holes or slots 14, 14 therein to receive bolts (not shown) for securing the feet in position. A one-piece annular strap 15 is integrally formed between the feet 13, 13 and has slots 17, 17 in the concave segmental spherical inner bearing portion 16 thereof which are in spaced opposed relationship to increase the width of the bearing wall 16 so that the unit 11 can be inserted horizontally through the slots and then tilted into vertical position to be seated on the bearing wall 16. As shown in Figure 2, the outer race ring 18 of the bearing unit 11 has a convex segmental spherical outer wall 19 mating with the wall 16 of the strap to retain the bearing unit 11 in tiltable relation in the pillow block. The inner surface of the outer race ring 18 is cylindrical and has a central ball groove 20 therearound for receiving a row of ball bearings 21.

The ball bearing unit 11 includes an inner race ring or sleeve 22 which has a cylindrical outer face with a groove 23 therearound for receiving the ball elements 21 and thereby coact with the outer race ring 18 for holding the rings in relatively rotatable relation without permitting appreciable axial shifting of the rings. The shaft 12 extends through the bore of the ring 22 and this ring 22 projects beyond the outer race ring 18. The projecting portions of the inner race ring have several tapped radial holes 24 therethrough. Set screws 25 are threaded through these holes to bite into the shaft 12 thereby fixedly locking the shaft and inner race ring against relative rotation.

A bearing cage or ball retainer R holds the balls 21 in circumferentially spaced relation and has a pocket for each ball.

A sealed chamber or ball space C is provided between the inner and outer race rings around the row of balls 21 by means of seals 26 according to this invention. Lubricant is supplied to this chamber C through a fitting 28 which is threaded into the strap 15 of the pillow block. A locking pin or tube 29 projects from this strap 15 beneath the fitting 28 into a dimple 30 formed in the outer race ring 18. A small bore 31 connects the bottom of this dimple with the chamber C. The pin and dimple relationship permits relative tilting of the ring 18 in the strap 15 but the pin at all times holds the fitting 28 in communication with the chamber C and prevents the ring 18 from rotating in the strap.

As best shown in Figure 3, each seal 26 includes a metal retainer ring or plate 32 and a metal flinger ring or plate 33. The retainer 32 has a flat outer rim 32a, a sloping side wall or flange 32b extending radially inward from the rim 32a, and axially outward at an acute angle A relative to the outer race ring 18, together with an inner rim or axially extending flange 32c closely adjacent the inner race ring 22 in spaced parallel relation therewith. The flinger 33 includes a flat inner rim or base 33a and a sloping side wall or flange 33b extending radially outward and axially inward from the inner race ring 22 and defining an obtuse angle B with the outer surface of the inner race ring.

The flat outer rim 32a of the retainer 32 is sized for press fit relationship into the cylindrical inner surface of the outer race ring 18 and this rim is sufficiently deep to hold the flange 32b against tilting when the rim is press fitted into the ring 18. The flange 32a is forced into the ring 18 by a suitable pressure fitting tool to a depth inwardly from the side face of the ring 18 so that a portion 34 of the inner face of the outer race ring 18 is uncovered or exposed. This portion is accurately ground to provide a finished bore surface around the entire inner circumference of the ring.

The flinger 33 is pressed onto the outer surface of the inner race ring 32 by a pressure fitting tool and its base 33a is sufficiently long to extend at least up to and preferably beyond the inner surface of the wall 32b to terminate in an upstanding shoulder 33c which, as shown in Figure 3, is axially inward from the wall 32b.

The outer edge of the flinger flange 33b terminates at 33d in close running clearance relationship with the surface 34 of the ring 18.

The outer edge of the rim 32a of the retainer 32 terminates at 32d in close running clearance relationship with the sloping inner face of the flinger flange adjacent the outer edge 33d thereof. Likewise, the outer edge 32e of the inner rim flange 32c of this retainer terminates in relatively closely spaced relation with the adjacent sloping portion of the flinger flange 33b.

A relatively enlarged space S is thereby provided between the retainer 32 and the flinger 33 and this space S communicates with the outside through an L-shaped gap 35 having one leg extending axially inward between the bore 34 and the flinger end 33d and the other leg extending radially inward and sloping axially outward between the edge 32d of the retainer rim 32a and the adjacent inner surface of the flinger flange. The space S also communicates with the sealed ball chamber C through an axially elongated gap 36 between the rim 32c of the retainer and the base 33a of the flinger. This gap 36 also has a sloping leg portion 36a between the edge 32e of the retainer rim 32c and the adjacent flinger flange surface.

In order for outside extraneous matter such as dirt to enter the space S, it is necessary that it travel through the L-shaped gap against the action of gravity and centrifugal force. The axially extending leg of this gap, being partially defined by the rotating flinger, is constantly subject to the centrifugal pumping action of the flinger edge 33d which tends to throw out any dirt particles tending to pass axially inward. Likewise, the other leg of this gap is continually cleaned by centrifugal force of the rotating flinger and any radial inward flow must be against this centrifugal force.

In order for grease to leave the chamber C to enter the chamber S, it is necessary that it pass through the elongated gap 36. The entrance mouth of this gap is continually freed by the edge 33c of the base 33a which throws the grease away from the gap.

The sealed space S is therefore sealed from the outside by an L-shaped gap which is continually subject to centrifugal action tending to prevent flow of material therethrough and is sealed from the inside by an elongated gap having a secondary leg providing an L-shaped path. It is preferred that the clearances between the parts defining the gaps 35 and 36 be in the nature of .003 to .012 inch.

In the event that grease is forced through the fitting 28 under high pressure while the bearing is operating, it is possible to force the grease to flow through the gap 36 into the space S. This grease, however, will, unless it is forced by pressure from the bearing chamber C, through the space S, remain in the space to coact with the flinger for providing a grease seal. It is probable that the grease will, between the rims 32a and 32c of the retainer, build up a grease wall having close running relationship with the flinger flange 33b thereby providing with the gaps 35 and 36 a labyrinth seal wherein the relatively rotating parts have close running clearance relationship along their entire confronting areas.

In the modification shown in Figure 4, the seal 26a operates in the same manner as the seal 26 but has the retainer snapped in a groove in the outer race ring instead of being press fitted into the outer race ring. As shown in Figure 4, the outer race ring 18 has a groove 37 around its inner periphery together with a countersunk bore 38 in the end thereof. The bore 38 has an axial wall 38a and a radially extending end or bottom 38b.

The seal 26a has a retainer ring 39 of L-shaped contour with a radially extending wall 39a having its outer end snapped in the groove 37 and an axially extending inner rim 39b overlying the inner race ring 22 in substantially parallel relation therewith. The wall 39a can initially be sloped so as to fit in the ring 18 and then flattened to extend into the groove 37 for anchoring the retainer to the outer race ring.

The seal 26a has a flinger 40 of the same type as the seal 26. This flinger includes the base 40a pressed on the inner race ring 22 and underlying the retainer leg 39d together with a sloping flange 40b extending radially outward and axially inward from the base into the counterbore 38 to have close running clearance relationship with both the side walls 38a and the bottom wall 38b of the counterbore. The inner edge 40c of the flinger base is flush with the inner surface of the retainer wall 39a. The retainer 39 and the flinger 40 coact to define a space S therebetween which communicates through an L-shaped gap 41 with the outside and through an elongated somewhat L-shaped gap 42 with the ball chamber C. As in the case of the seal 26, these gaps have close running clearance relationship between the relative rotating parts defining the gaps and ingress of dirt through the gap 41 as well as ingress of grease through the gap 42 is inhibited by centrifugal action of the rotating flinger. As in the case of the seal 26, if grease is pumped from the ball chamber C into the space S, it will tend to form a grease seal in this space having close running clearance relationship with the inner face of the flinger flange 40b.

In the second modification shown in Figure 5, the seal 26b has the same flinger and retainer parts as the seal 26 with the exception that the retainer is provided with a cross web normal to the rims. In the seal 26b, the retainer 43 has a flat outer rim 43a pressed into the outer race ring 18 beyond the outer edge of this ring together with a radially inwardly extending web wall or base wall 43b and an inner rim flange 43c extending axially in parallel relation to the outer rim 43a and to the inner race ring 22. The flinger 44 is L-shaped in cross section and has a base 44a pressed on the inner race ring together with a radially outward and axially inward sloping flange 44b spanning the space between the inner and outer race rings and terminating in closely spaced relation to the outer race ring.

The retainer 43 carries a metal ring 45 with an outer rim portion 45a forced into tight fitting relation in the outer rim 43a of the retainer and bottomed on the wall 43b thereof. The ring 45 has a sloping wall 45b extending diagonally across the space between the rims 43a and 43c of the retainer and beyond the outer edge of the rim 43c to a radial flange 45c overlying the edge of the rim 43c and projecting beyond the rim in close running clearance relationship with the base 44a of the flinger. The ring 45 is effective to divide the space between the flinger and retainer into two spaces S₁ and S₂. The space S₁ communicates with the outside only through an L-shaped gap 46 while the space S₂ communicates with the inside ball chamber through an L-shaped gap 47. Grease may enter the space S₂ through the gap 47 but cannot pass into the space S₁ unless it flows through a second gap 48 between the edge of the flange 45c of the ring and the base 44a of the flinger. Dirt can only enter the space S₁ through the L-shaped gap 46. In this modification, therefore, the third ring is effective to add another barrier to flow of grease and to divide the seal chamber between the flinger and retainer into a plurality of compartments.

In the embodiment shown in Figure 6, the seal 26c has the same retainer 43 and the same flinger 44 as the seal 26b of Figure 5, but instead of carrying the metal ring 45, the retainer carries a resilient ring 49 preferably composed of synthetic rubber. This ring 49 snugly fits in the channel of the U-shaped retainer 43 and has a semi-cylindrical recess 49a in its outer face. This recess 49a is bounded by a leg 49b adjacent the retainer rim 43a and projecting therebeyond to ride on the flinger flange 44b. Grease may flow through the gap 47 into the cylindrical recess 49a to lubricate the flinger flange engaging surface of the leg 49b. As in the case of the other seals, the entrance gap 46 is L-shaped to resist ingress of dirt.

From the above descriptions, it should be understood that the seals of this invention are composed of a retainer ring and a rotating flinger which cooperate to provide a chamber therebetween and this chamber is in communication with the outside through an L-shaped gap and with the inside of the bearing space through an elongated axially extending gap. The seals of this invention may receive grease in the space provided between the retainer and flinger but in the event that this space becomes packed with grease, the grease will itself form a seal in close running clearance relationship with the flinger. The gaps giving access to the space between the retainer and flinger are defined by relatively rotating walls in close running clearance relation preferably about .003 to .012 inch apart.

It will be understood that modifications and variations may be effected without departing from the scope of the novel concepts of the present invention.

I claim as my invention:

1. In combination with a pair of rings disposed one within the other and held in radially spaced apart relationship and against axial relative movement, a first sealing ring secured in the outer ring and extending inwardly toward the inner ring and thence axially outward in substantially parallel spaced relation from the inner ring, a second sealing ring secured on the inner ring and having a base extending under the axially outward extending portion of the first sealing ring, said second sealing ring having a flange extending radially outward and axially inward from said base toward the outer ring, the end of said flange having close running clearance relation with adjacent ring surfaces to define therewith an L-shaped gap having a first leg extending axially inward and a second leg sloping radially inward and axially outward, said first and second sealing rings defining an enlarged space therebetween communicating with the outside only through said L-shaped gap and communicating with the space between said pair of radially spaced apart rings through an elongated gap between the base of the second ring and the adjacent axially outward extending portion of the first ring, said gap having a width of not more than about .003 to .012 inch and being effective to prevent ingress of dirt into said space between the pair of radially spaced apart rings and loss of lubricant from said space.

2. The combination with outer and inner rings disposed one within the other and held in radially spaced apart relation and against substantial relative movement in an axial direction for concentric rotation of the inner ring in the outer ring, of a retainer ring having a U-shaped cross section with an outer peripheral rim secured in the outer ring, a cross web extending radially inward from the inner end of the outer peripheral rim and an inner peripheral rim extending axially outward from the cross web in spaced parallel overlying relation with the inner ring, a flinger ring having an inner peripheral base rim pressed on the inner ring and underlying the inner peripheral rim of the retainer ring and terminating closely adjacent said cross web of the retainer ring, said flinger ring having a sloping flange extending radially outward and axially inward from the outer end of the base to an end edge lying radially inward from the outer ring and axially outward from the outer peripheral rim of the retainer ring in close running clearance relation to provide therebetween an L-shaped gap, a resilient ring snugly seated in the channel of the U-shaped retainer ring against the rims and cross web thereof to be fixedly held thereby and present an exposed face projecting axially beyond the outer peripheral rim but terminating axially inward from the inner peripheral rim of said retainer ring, said flinger flange engaging and riding on a portion of said exposed face of the resilient ring and diverging from said face to provide a space axially outward from said face and bottomed by the projecting portion of the inner rim of the retainer ring, whereby rotation of the inner ring will rotate the flinger ring for co-acting with the retainer ring and resilient ring to seal the space between the inner and outer rings.

3. A seal adapted for an industrial ball bearing unit which comprises a retainer ring of U-shaped cross section having an outer rim adapted for press fitting into the outer ring of a bearing unit, a cross web for extending radially across the space between the outer and inner rings of a bearing unit and an inner rim for overlying the inner race ring of a bearing unit in spaced parallel relation therewith, a resilient ring seated in the channel of the retainer ring in snug fitting relation to be held therewith against rotation, said resilient ring having an exposed outer face projecting axially beyond the outer rim of the retainer ring and terminating axially inward from the end of the inner rim of the retainer ring, a flinger ring of L-shaped cross section having an inner peripheral rim adapted for press fitting onto the inner race ring of a bearing in underlying relation to the inner peripheral rim of the retainer ring for terminating in closely spaced relation with the cross web of the retainer ring, said flinger having a sloping leg extending radially outward and axially inward from the outer end of the base leg into closely spaced relation with the outer rim of the retainer, said sloping leg providing a wall portion compressively loading a portion of the exposed face of the resilient ring adjacent the outer periphery thereof and diverging from said outer face to provide a space bottomed by the projecting portion of the inner rim of the retainer ring, and said sloping leg of the flinger having a flat peripheral edge for close running clearance relation with the outer race ring of a bearing unit.

4. A bearing seal which comprises a retainer ring of U-shaped cross section having flat outer and inner peripheral rims with a connecting cross web, said inner peripheral rim extending axially beyond said outer peripheral rim to provide a projecting ledge, a resilient ring snugly seated in the channel of the U-shaped retainer to be held thereby against relative rotation therewith, said resilient ring having an exposed outer face projecting axially beyond the outer peripheral rim of the retainer ring but terminating axially inward from the inner peripheral rim of the retainer ring, a finger ring having a flat inner peripheral rim surrounded by the inner peripheral rim of the retainer ring in spaced parallel relation therewith and terminating closely adjacent the cross web of the retainer ring, said flinger ring having a sloping flange portion extending radially outward and axially inward from the outer end of the inner peripheral rim thereof to terminate radially inward and axially outward from the outer peripheral rim of the retainer ring, and said flinger flange engaging and riding on a portion of the resilient ring adjacent said outer peripheral rim of the retainer ring and thence diverging from the exposed face of the resilient ring to provide a space bottomed by the projecting ledge of the inner peripheral rim of the retainer ring.

5. The combination with relatively rotating inner and outer rings held in radially spaced relation and against substantial relative movement in an axial direction, of a seal carried by said rings for cooperating therewith to define one end of a sealed grease chamber between the rings, said seal having a retainer secured in the outer ring and extending inwardly toward the inner ring and then axially outward, said axially outward extending portion of the retainer being in spaced parallel relation with the inner ring, said seal also having a flinger with a base on the inner ring underlying the axial extending portion of the retainer in spaced parallel relation, said flinger having a radially outward and axially inwardly inclined flange overlying the axially outward extending portion of the retainer in close running clearance relation therewith, said retainer and flinger defining an enlarged space therebetween communicating with the grease chamber along the axially elongated narrow gap between the base of the flinger and the axially outward extending portion of the retainer, said gap adapted to transmit grease under pressure from the grease chamber into said enlarged space and form a grease seal in said enlarged space in close running clearance relation with the flange of the flinger and held against radial discharge from said space by the inward incline of said flinger flange, and said flange of the flinger having a radial outer edge in substantially parallel close running clearance relation with the outer ring to form a second narrow gap coacting with the inward incline of the flange to retain grease in said enlarged space.

6. The combination with outer and inner rings disposed one within the other and held in radially spaced apart relation and against substantial relative movement in an axial direction for concentric rotation of the inner ring in the outer ring, of a channel ring having inner and outer flat rims with a connecting web, said channel ring having the outer flat rim thereof press fitted on the inner periphery of the outer ring, a resilient ring snugly seated in the channel of the channel ring and having an exposed face projecting axially beyond the outer edge of the outer rim but terminating axially inward from the outer edge of the inner rim and an L-shaped flinger ring having an inner peripheral base press fitted on the outer periphery of the inner ring, and a straight sloping flinger flange on said flinger engaging a portion of the exposed face of the resilient ring adjacent the outer periphery thereof and thence diverging therefrom.

7. The combination with a pair of rings disposed one within the other and held in radially spaced apart relation and against substantial relative movement in an axial direction, of a U-shaped third ring having a base portion pressed onto the outer ring, said base portion extending axially inwardly, a web portion extending radially inwardly from said base portion and a flange portion extending axially outwardly from said web portion and overlying the inner ring, said base portion and flange portion being in parallel spaced relation, a flinger having a base pressed on the inner ring and underlying the axially outward extending flange portion of the third ring together with a radially outward and axially inward sloping flinger flange portion spaced axially outward from the third ring, said third ring and flinger defining a closed space therebetween, said sloping flinger flange having a radial outer end edge, said edge coacting with the edge of the base portion of the third ring to provide a sloping gap leg, said outer ring coacting with the outer edge of the flinger flange to define an axial gap leg of substantial uniform width, and said sloping gap leg and said axial leg together defining an L-shaped gap joining the outside with the radial and axially outer end of said space, said third ring and flinger further coacting at the radial inner end of said closed space to form a second L-shaped gap having a radially inward and axially outward extending first leg and an elongated axially inward extending second leg, said L-shaped gaps being narrow and defined by relatively moving parts in close running clearance relationship and effective to seal said space from the outside and from the space between the ring.

8. The seal of claim 5 including a third ring carried by the retainer and extending generally diagonally across said space between the retainer and flinger into close running clearance relation with the flinger to divide said space into two compartments.

9. The seal of claim 5 wherein the outer ring has a surface extending inwardly adjacent and inside of the outer end portion of the flinger flange to cooperate with said flange and the second narrow gap for defining an inward extension of said gap opening into said space.

References Cited in the file of this patent

UNITED STATES PATENTS

| | | |
|---|---|---|
| 1,420,416 | Dlesk | June 20, 1922 |
| 1,895,288 | Larsh | Jan. 24, 1933 |
| 1,986,621 | Bott | Jan. 1, 1935 |
| 2,189,685 | Stevenson | Feb. 6, 1940 |
| 2,189,838 | Shafer | Feb. 13, 1940 |
| 2,267,875 | Reynolds | Dec. 30, 1941 |
| 2,275,996 | Searles | Mar. 16, 1942 |
| 2,385,306 | Shafer | Sept. 18, 1945 |
| 2,391,007 | Buckendale | Dec. 18, 1945 |
| 2,415,888 | Joy | Feb. 18, 1947 |